United States Patent
Suzuki et al.

Patent Number: 6,136,380
Date of Patent: Oct. 24, 2000

[54] METHOD OF COATING BRAZING MATERIAL AND APPARATUS THEREFOR

[75] Inventors: Toshihiro Suzuki, Numazu; Tsunehiko Tanaka; Meitoku Ogasawara, both of Fuji, all of Japan

[73] Assignee: Nippon Light Metal Company Ltd., Tokyo, Japan

[21] Appl. No.: 08/941,326

[22] Filed: Sep. 30, 1997

Related U.S. Application Data

[63] Continuation of application No. 08/708,355, Sep. 4, 1996, abandoned.

[30] Foreign Application Priority Data

Sep. 8, 1995 [JP] Japan ................................ 7-256884

[51] Int. Cl.⁷ .............................. B05D 1/18; B05D 3/02; B05D 3/12
[52] U.S. Cl. ................................ 427/434.2; 427/376.1; 427/435; 427/436
[58] Field of Search ............................. 427/376.1, 430.1, 427/435, 434.2, 436, 190, 191; 118/423, 428, 429, 405, 419; 228/36, 37, 40

[56] References Cited

U.S. PATENT DOCUMENTS

| | | | |
|---|---|---|---|
| 2,968,067 | 1/1961 | Long | 427/434.2 |
| 3,703,253 | 11/1972 | Roffelsen | 228/17 |
| 3,930,462 | 1/1976 | Day | 118/5 |
| 4,556,165 | 12/1985 | Yamawaki et al. | 228/223 |
| 4,609,563 | 9/1986 | Shimrock et al. | 427/8 |
| 4,891,275 | 1/1990 | Knoll | 428/650 |
| 5,073,415 | 12/1991 | Taylor et al. | 427/433 |
| 5,100,048 | 3/1992 | Timsit | 229/198 |
| 5,147,692 | 9/1992 | Bengston | 427/438 |
| 5,190,596 | 3/1993 | Timsit | 148/23 |
| 5,360,158 | 11/1994 | Conn et al. | 228/56.3 |
| 5,518,070 | 5/1996 | Kato | 165/180 |
| 5,549,927 | 8/1996 | Cottone et al. | 427/191 |
| 5,564,497 | 10/1996 | Fukuoka et al. | 165/152 |

Primary Examiner—Shrive Beck
Assistant Examiner—Michael Barr
Attorney, Agent, or Firm—Heslin & Rothenberg, P.C.

[57] ABSTRACT

After immersing an extruded flat tubed strip, in an immersion tank containing a slurry of a brazing material having brazing metallic powder and brazing flux powder mixed in alcohol that has binder dissolved therein, the extruded flat tubed strip is pulled up virtually vertically. Furthermore, the slurry coated on the extruded flat tubed strip pulled up from the immersion tank is dried and bonded/baked on the extruded flat tubed strip through the drying means.

2 Claims, 4 Drawing Sheets

LATERAL VIEW

LONGITUDINAL VIEW

LATERAL VIEW

LONGITUDINAL VIEW

LATERAL VIEW

LONGITUDINAL VIEW

METHOD OF COATING BRAZING MATERIAL AND APPARATUS THEREFOR

This application is a continuation, of application Ser. No. 08/708,355, filed Sep. 04, 1996, now abandoned.

FIELD OF THE INVENTION

The present invention relates to a method of coating a body with a brazing material and an apparatus therefor, and in particular, to a method of coating with a brazing material and an apparatus therefor for brazing fins on brazing heat exchange tubes in connection with a heat exchanging device made of aluminum alloy.

BACKGROUND OF THE INVENTION

Generally, an aluminum alloy heat exchange device with aluminum alloy fins and aluminum alloy heat exchange tubes brazed thereon is used widely, and furthermore, in order to increase the heat exchange rate, an extruded flat tubed strip as a heat exchanging tubes formed by extrusion of aluminum alloy material is often used.

In order to manufacture a heat exchange device structured in such a manner as above, as a method of coating metallic particles for making a brazed connection on the surface of a body, for instance, an extruded flat tubed strip used as a heat exhange device, there is known generally a method of turning the metallic particles into a slurry by using water or a solvent and binder and coating with this slurry by spraying with a spray gun. Furthermore, other coating methods such as brushing and screen printing are known.

However, the method of spraying with a spray gun suffers from bad coating efficiency because coating is conducted by moving the spray gun over the surface of the body, and furthermore, the spray gun itself may become clogged up. On the other hand, the coating method of brushing or screen printing is not amenable for continuous coating.

Moreover, since volatile solvents are made of organic medium and most often poisonous, there is a need to be cautious, and consequently, solvents such as these are not used very much. Also, other than the volatile solvent, there is a need to preheat the extruded flat tubed strip. When the preheating temperature is low, the sticking of slurry is prevented, and this causes the slurry to drip, and if the temperature is too high, the deposited slurry is repelled and this causes problems with the coating process. Therefore, there are problems such as a high demand for temperature control of a coating body, that is, a body to be coated, as well as enlargement and increased complexity of the pertinent facility.

SUMMARY OF THE INVENTION

This invention was made in consideration of the above matters, and the purpose of the present invention is to provide a method of coating an aluminum extended flat tubed strip with a brazing material and an apparatus therefor which can easily and uniformity apply the brazing material on a strip to be coated.

In order to carry out the purpose stated above, the method of coating a strip with a brazing material features a process of immersing the strip into a slurry of the brazing material, which comprises a combination of brazing metallic powder and brazing flux powder mixed in alcohol with a dissolved binder and a process of pulling the coated strip up substantially vertically.

The method of coating the brazing material above further features a process of baking and sticking the slurry while being pulled up.

An apparatus of coating a brazing material features an immersion tank for containing a slurry of the brazing material, which comprises a combination of brazing metallic powder and brazing flux powder mixed in alcohol with a dissolved binder, and a conveying means for guiding the strip within the immersion tank and for pulling the coated strip up substantially vertically from the immersion tank.

The apparatus of coating brazing material further features a drying means for sticking/baking the slurry coated onto the strip while the coated strip is being pulled out from the immersion tank.

According to the present invention, after immersing the strip into the slurry of the brazing material, which comprises a combination of brazing metallic powder and brazing flux powder mixed in alcohol with a dissolved binder, and by pulling the strip up substantially vertically, the brazing material can be uniformly coated on the surface of the strip. Furthermore, by sticking/baking the slurry onto the strip pulled up from the tank by using the drying means, the coating uniformity of the brazing material can be maintained.

DESCRIPTION OF THE PREFERRED EMBODIMENT

The present invention will now be explained in reference to the figures. In this instance, the explanation below is given with respect to an aluminum alloy heat exchanger.

Figure 1:
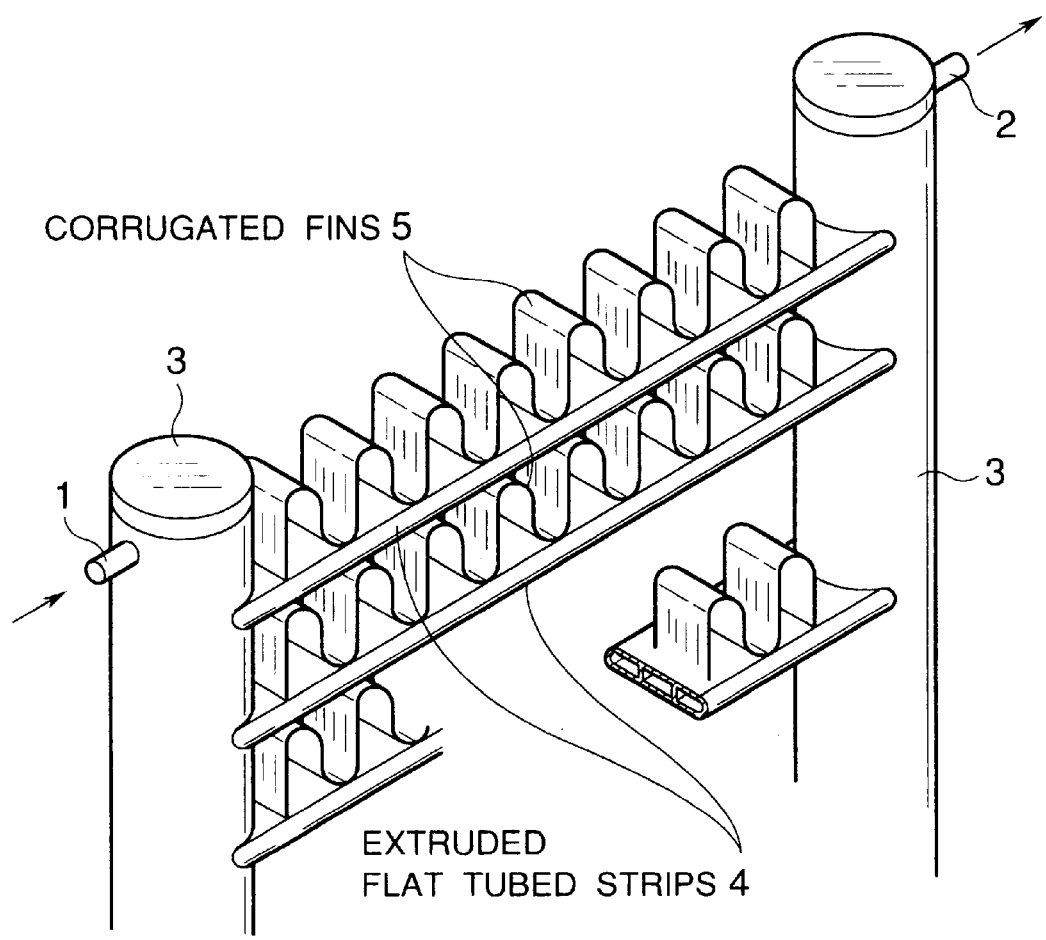
FIG. 1 shows a perspective schematic drawing that is an example of a heat exchange device brazed together by a brazing method of this invention.

The heat exchanger, as shown in FIG. 1, comprises a pair of header pipes 3 opposite to each other having either an inlet 1 or an outlet 2 for a heating medium, a plurality of extruded flat tubed strips 4 as heat exchanging tubes arranged in parallel and connected to the header pipes 3, and corrugated fins 5 disposed between the extruded flat tubed strips 4. The header pipes 3 and the extruded flat tubed strips 4 are made of the aluminum alloy extruded structural material, and the corrugated fins 5 are formed by bending the aluminum alloy strip material in a serpentine manner, and then the extruded flat tubed strip 4 and the corrugated fins 5 are brazed together to produce a heat exchanger.

Figure 2:
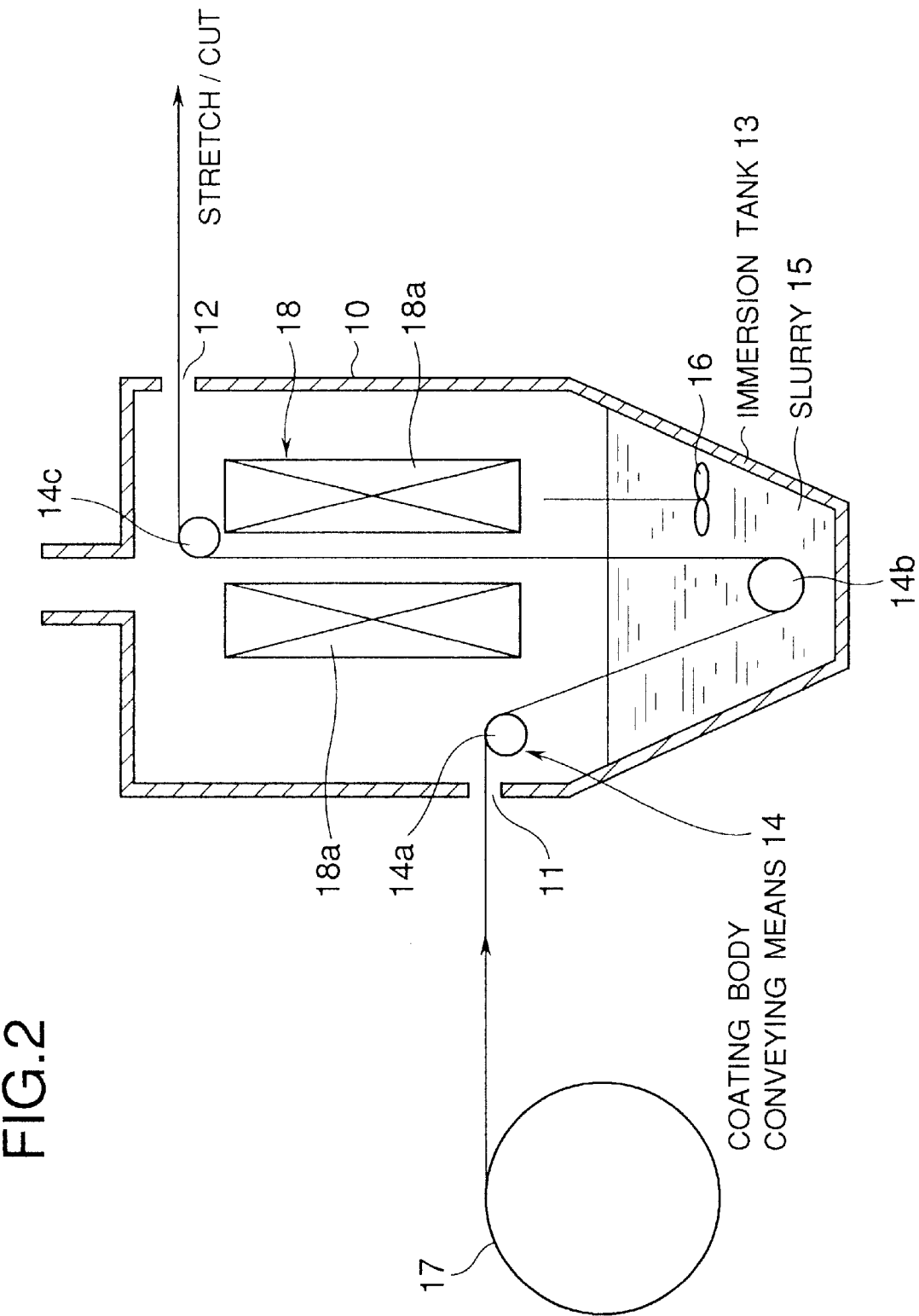
FIG. 2 shows a cross-sectional schematic drawing of an example of a coating apparatus of this invention.

As an example, the corrugated fins 5 can be brazed on the surface of the extruded flat tubed strips 4 which has been coated with the brazing material 6 with a use of the coating appratus shown in FIG. 2.

The coating apparatus mentioned above comprises a conveyor inlet 11 for a body, that is, the extruded flat tubed strip 4, at the middle part of one side of a main body 10 of the apparatus, a conveyor outlet 12 at the upper side of the other side of the main body 10, an immersion tank 13 located at the bottom portion of this body 10, a conveyor means 14 for guiding the extruded flat tubed strip 4 within the immersion tank 13 and for pulling this strip up virtually vertically, and a drying means 18 for drying, and at the same time, sticking/baking a slurry 15 deposited on the surface of the extruded flat tubed strip 4 pulled up from the tank 13.

In this instance, the slurry 15 of the brazing material comprising a combination of brazing metallic powder and brazing flux powder mixed in alcohol with a dissolved binder is contained within the above-mentioned immersion tank 13, and the homogenous composition is maintained by an agitator 16.

The above-mentioned conveyor means 14 comprises a first guide roller 14a for guiding within the immersion tank 13 the extruded flat tubed strip 4 pulled out from a supplying part 17 of the extruded flat tubed strip 4 rolled up in a coil formation and placed near the conveyor inlet 11, a second guide roller 14b, placed inside the immersion tank 13, for guiding upwards the extruded flat tubed strip 4 delivered into the immersion tank 13, and a guide roller 14c for guiding approximately in the horizontal direction the extruded flat tubed strip 4 pulled up virtually vertically from the immersion tank 13. The guide rollers 14a, 14b, and 14c are rotationally driven by a motor and by transmitting mechanical structures not shown in the figure.

The above-mentioned drying means 18 comprises a pair of dryers 18a, placed above the immersion tank 13 for drying and sticking/baking the both surfaces of the extruded flat tubed strip 4. The drying means 18 is structured such that the coated extruded flat tubed strip 4 is heated when the volume of the coated slurry on the strip reaches equilibrium after the excess slurry drips off, while the strip is pulled up virtually vertically from the immersion tank 13.

Next, a method of coating the brazing material of the present invention is explained. First, the slurry 15, which has a combination of brazing flux powder and brazing metallic powder added in alcohol with binder dissolved therein, is made, and is provided within the immersion tank 13. Next, after immersing the extruded flat tubed strip 4 rolled out from the coil of the extruded flat tubed strip 4, the strip is pulled up almost vertically by the second guide roller 14b from the immersion tank 13 via a first guide roller 14a from the conveyor inlet 11 of the main body 10. During this pulling-up period, the excess slurry 15 drips off, and at the point the slurry 15 deposited on the extruded flat tubed strip 4 reaches an equilibrium, drying and sticking/baking processes are conducted by the drying means 18. Then, after converting the extruded flat tubed strip 4 from the vertical position to a horizontal position by the third guide roller 14c, the strip is reformed and rearranged and, at the same time, cut into pre-determined lengths.

Therefore, according to the coating method of the above embodiment, because the extruded flat tubed strip 4 is completely immersed and the surface of the strip is entirely covered with the slurry 15, the entire surface of the extruded flat tubed strip 4 can be uniformly coated. Furthermore, by pulling up vertically, the amount of deposition on the surface is made even, and because the excess slurry deposited drips off along the extruded flat tubed strip 4, the efficiency of coating is increased.

Furthermore, by changing the composition of the combined mixture of the brazing flux powder and the metallic powder, the amount of deposition of the brazing material can be easily changed. Moreover, according to the coating method above, the extruded flat tubed strip 4 can be continuously provided (immersed) and the brazing material continuously coated on the surface of the strip. Still further, according to the coating apparatus of the present invention, simplification and cost reduction can be achieved in comparison with the spray coating apparatus.

In the above embodiment, the explanation is given where the coated body is the extruded flat tubed strip 4 made of aluminum alloy, but the brazing material can be similarly coated onto an aluminum alloy structure other than the extruded flat tubed strip 4.

Next, the method of coating the brazing material of the present invention is explained in conjunction with an experiment for determining the influence the angle at which the coated body is pulled up after immersion have on coating.

Experimental Condition

Brazing Material (Slurry 15)

solvent: isopropyl alcohol (IPA)

binder: thermal plastic acrylic resin binder product name: PARALOID B-67 (Rohm and Haas Company)

metallic and flux powder: Si:flux=1:2 added concentration: 20% in IPA

Coated body: extruded flat tubed strip.

Figure 3A:
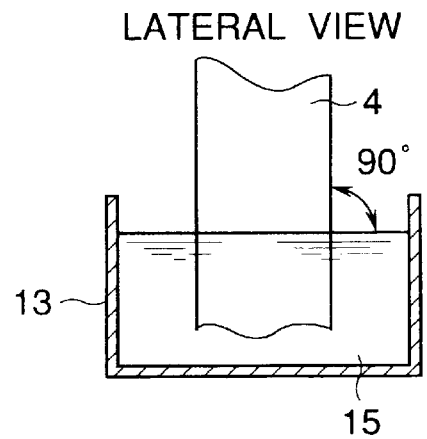
FIG. 3A is a cross-sectional schematic drawing indicating a coated strip being pulled up vertically from the slurry seen in a lateral view.
Figure 3B:
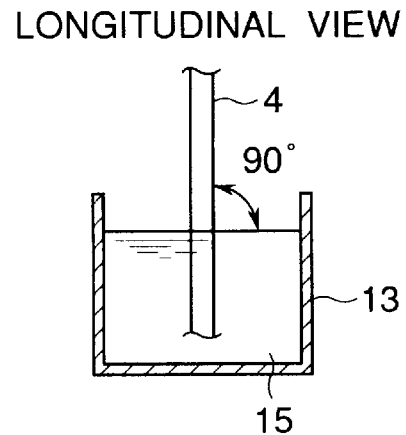
FIG. 3B is a cross-sectional schematic drawing indicating a coated strip being pulled up vertically from the slurry seen in a longitudinal view.
Figure 4A:
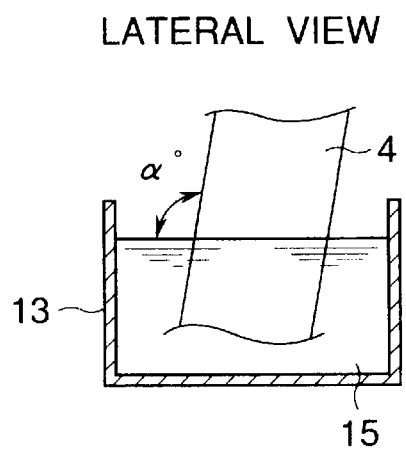
FIG. 4A is a cross-sectional schematic drawing indicating an inclined coated strip being pulled up from the slurry seen in a lateral view.
Figure 4B:
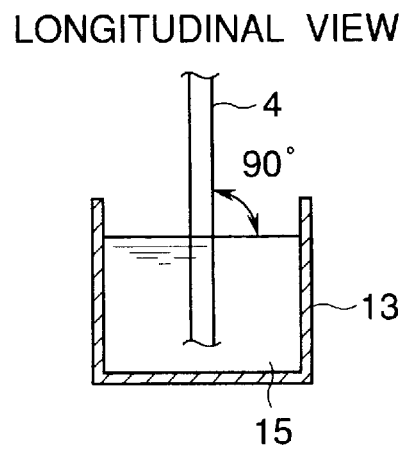
FIG. 4B is a cross-sectional schematic drawing indicating a coated strip being pulled up vertically from the slurry seen in a longitudinal view.
Figure 5A:
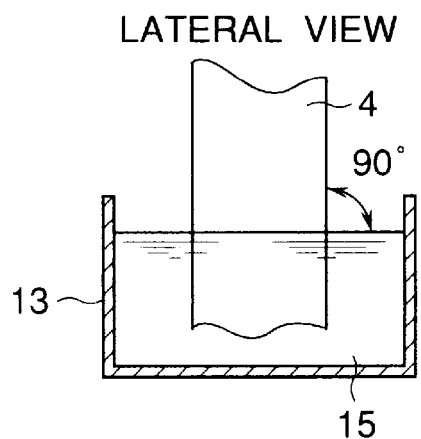
FIG. 5A is a cross-sectional schematic drawing indicating a coated strip being pulled up vertically from the slurry seen in a lateral view.
Figure 5B:
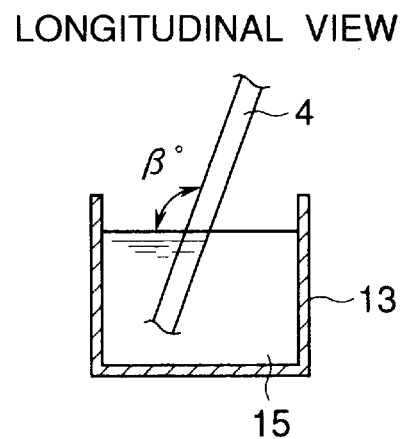
FIG. 5B is a cross-sectional schematic drawing indicating an inclined coated strip being pulled up from the slurry seen in a longitudinal view.

After immersing the extruded flat tubed strip 4 into the slurry 15 of the above, the strip was pulled up as shown in FIGS. 3 to 5. That is, figures show instances where the extruded flat tubed strip 4 was pulled up perpendicularly with respect to the surface of the slurry seen in lateral and longitudinal views (see FIGS. 3A and 3B), where the inclination angle $\alpha°$ of the extruded flat tubed strip 4 seen in a lateral view was greater than 90° (for example, 110°) (see FIG. 4A), and where the inclination angle $\beta°$ in a longitudinal view was greater than 90 ° (for example, 110°) (see FIG. 5B). The deposition condition of the slurry was such that when the extruded flat tubed strip 4 was pulled up roughly perpendicularly with respect to the surface of the slurry in both lateral and longitudinal views, the coating condition was uniform throughout the surface for deposition, and there was absolutely no significant difference in deposition between the front and back surfaces of the extruded flat tubed strip 4. In contrast, as shown in FIG. 4A, when there was an inclination from a perspective of a lateral view, the deposited slurry 15 did not drip off as it should have and the there was nonuniformity in the lateral direction. Furthermore, as shown in FIG. 5A, when there was an inclination as seen from a longitudinal view, there were noted differences in deposition between the front and back surfaces of the extruded flat tubed strip 4 as the excess slurry 15 remained on the back surface.

When the inclined angle (pulling-up angle) in respect to a lateral or longitudinal views was set to 50°, 60°, 70°, 80°, and 90°±5° and the deposition condition of the slurry 15 on the extruded flat tubed strip 4 was examined for each case, results were obtained as shown in Table 1 for the case of inclination angles in respect to a lateral view and Table 2 for the case of inclination angles in respect to a longitudinal view.

In the case the extruded flat tubed strip was pulled up virtually vertically from the perspective of both lateral and longitudinal views, there was no significant difference on the deposition condition between the front and back surfaces as the entire surface was uniformly coated, but in the case of the other inclination angles, there were problems such as residual slurry collected at the bottom portion along the length of the extruded flat tubed strip and obvious differences in the amount of deposition between left and right sides along the length of the extruded flat tubed strip.

According to the present invention, after immersing a strip in a slurry of a brazing material containing brazing metallic powder and brazing flux powder mixed in alcohol which has binder dissolved therein, because the coated strip is pulled up virtually vertically, the surface of the coated strip is uniformly coated with the brazing material without producing slurry deposition differences between the front and back surfaces of the coated strip. Furthermore, because the excess deposition slurry drips off along the length of the coated strip, the efficiency of coating can be increased. Moreover, by sticking/baking the slurry on the coated strip pulled up from the immersion tank through the drying means and such, coating uniformity of the brazing material can be maintained.

TABLE 1

| PULLING ANGLE | DEPOSITION CONDITION | REMARK |
| --- | --- | --- |
| 50° | X | LIQUID RESIDUE PRODUCED AT THE LOWER PARALLEL PORTION |
| 60° | X | LIQUID RESIDUE PRODUCED AT THE LOWER PARALLEL PORTION |
| 70° | X | LIQUID RESIDUE PRODUCED AT THE LOWER PARALLEL PORTION |
| 80° | X | AMOUNT OF DEPOSITION DIFFERENCE FOUND BETWEEN THE RIGHT AND LEFT PORTIONS |
| 90° ± 5° | O | NO PROBLEM |

TABLE 2

| PULLING ANGLE | DEPOSITION CONDITION | REMARK |
| --- | --- | --- |
| 50° | X | LIQUID RESIDUE PRODUCED ON THE BACK SURFACE |
| 60° | Δ | AMOUNT OF DEPOSITION DIFFERENCE FOUND BETWEEN THE FRONT AND BACK SURFACES |

TABLE 2-continued

| PULLING ANGLE | DEPOSITION CONDITION | REMARK |
| --- | --- | --- |
| 70° | Δ | AMOUNT OF DEPOSITION DIFFERENCE FOUND BETWEEN THE FRONT AND BACK SURFACES |
| 80° | Δ | AMOUNT OF DEPOSITION DIFFERENCE FOUND BETWEEN THE FRONT AND BACK SURFACES |
| 90° + 5° | O | NO PROBLEM |

What is claimed is:

1. A method of coating an aluminum extruded tubed strip with a brazing material comprising the steps of:

immersing an aluminum extruded tubed strip to be coated in an immersion tank containing a slurry of brazing material having a combination of brazing metallic powder and brazing flux powder mixed in alcohol which has an acrylic resin binder dissolved therein, to produce a slurry coated strip;

agitating the slurry in the immersion tank while the strip is immersed in said slurry to maintain a homogeneous slurry composition in said tank;

pulling up said slurry coated strip substantially vertically from said immersion tank; and baking said slurry coated strip with drying means placed above said immersion tank to stick said slurry onto said strip after excess slurry drip off has stopped and while said slurry coated strip is being pulled up substantially vertically from said immersion tank, said immersion step and said baking step being performed within a main body forming said immersion tank and enclosing said drying means.

2. The method of claim 1 wherein said aluminum extruded tubed strip is fed to said immersion tank from a supply coil through an inlet at one side of said main body; and the slurry coated strip is conveyed from an upper end of said drying means to outside of said main body for cutting the slurry coated strip into predetermined lengths through an outlet at another side of said main body, said outlet being at an elevation at least as high as said upper end of said drying means.

* * * * *